United States Patent [19]

Ricci

[11] Patent Number: 4,856,390
[45] Date of Patent: Aug. 15, 1989

[54] VALVE RESEATER APPARATUS AND METHOD

[76] Inventor: Donato L. Ricci, 834 Spring Creek Rd., Red Wing, Minn. 55066

[21] Appl. No.: 158,224

[22] Filed: Feb. 19, 1988

[51] Int. Cl.$^4$ .............................................. B23B 3/26
[52] U.S. Cl. .................................. 82/172; 29/402.06; 82/1.2
[58] Field of Search ...................... 29/157.1 R, 402.06, 29/402.19; 82/1 A, 1.2, 1 C, 1.4, 2 A, 2 Z, 4 R, 4 C; 408/181, 184, 185

[56] References Cited

U.S. PATENT DOCUMENTS 4,050,836 9/1977 Anders .............................. 82/4 C X Primary Examiner—Mark Rosenbaum
Assistant Examiner—Frances Chin
Attorney, Agent, or Firm—Merchant, Gould, Smith, Edell, Welter & Schmidt

[57] ABSTRACT

An apparatus and method for forming a valve seat while the valve body is positioned in-line are disclosed. The valve reseater apparatus (25) includes stabilizers (27) for positioning the valve reseater (25) near the valve seat (21) to be repaired, as well as a cutting tool (42) mounted on a tool head (41) which is rotated by means of a revolution shaft (44) interconnected with a motor (34). The cutting tool (42) is simultaneously translated by means of translation screws (66, 67) which are controlled by means of a rotatable hand knob (56). The circumference of rotation is automatically controlled by means of a star wheel arrangement.

2 Claims, 5 Drawing Sheets

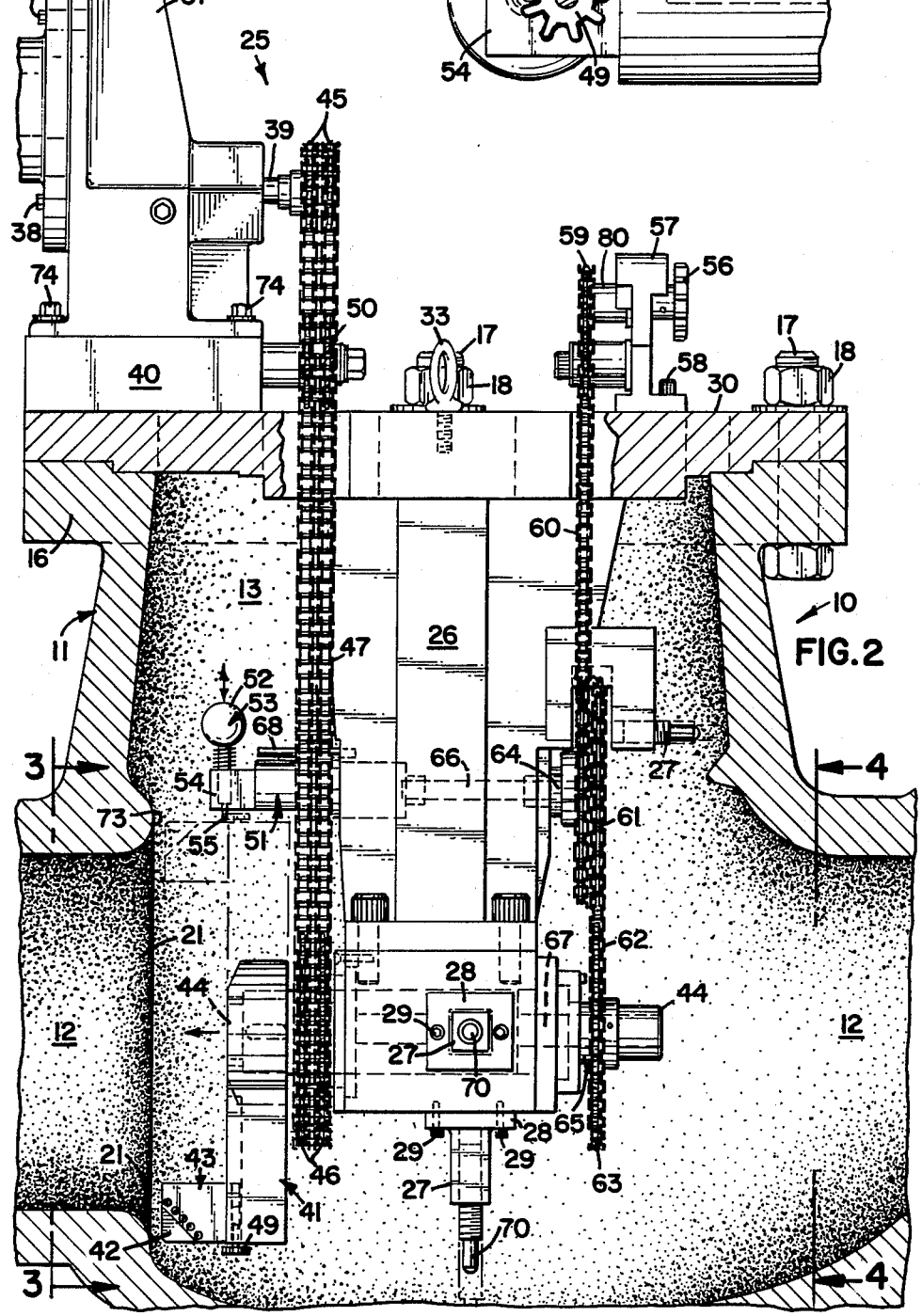
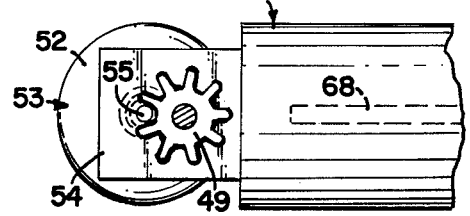

VALVE RESEATER APPARATUS AND METHOD

BACKGROUND OF THE INVENTION

1. Field of the Invention

The present invention relates generally to valves, and, in particular, to a portable apparatus for machining a valve seat.

2. Description of the Prior Art

A valve seat provides the surface upon which a valve rests to regulate the flow of fluids in piping systems. As such, valve seats are a very important component of a valve system, because failure or erosion of a valve seat results in leakage of the fluid being conveyed. In applications such as power plants, a solid metal valve seat is required because of the extreme pressures and temperatures of the steam, oil, and gases being conveyed. However, even metal valve seats become worn over time, resulting in seepage or leakage.

Valve leakage also results because of the repeated pressure of the valve disk on the seat. As a result, the shape of the valve seat tends to become flattened. Deterioration of the valve seat also occurs because of corrosion, steam and water. In addition, deposits may build up on the valve seat, preventing a tight seal with the disk.

In some applications, replaceable valve seat rings may be utilized, but these types of valve seats also tend to erode and deteriorate. In addition, replaceable seat rings are specially manufactured for only a limited number of valve designs and are simply unavailable for a great many applications.

Therefore, it is typically necessary to replace the entire valve when the valve seat wears away and causes leakage problems. Replacing the entire valve body and interior valve assembly is expensive, time-consuming, and inconvenient. Typically, the valve body is connected with the pipeline by means of welding, and the welds must be taken out in order to remove the valve assembly. Rewelding must then be performed in order to install the new valve assembly, a process which is labor-intensive and expensive.

As an alternative to complete replacement of the valve assembly, it is possible to repair the valve seat by rewelding the seat and machining it to the desired shape, or to simply remachine the valve without welding it first. However, the machining process cannot be accomplished in-line with conventional tools; it is necessary to take out the welds which interconnect the pipe and valve body, lift the valve body out of the line, and transport the valve to and from the machine shop or original equipment manufacturer. This process is very time-consuming and results in substantial shut-down time.

The present invention addresses these and many other problems associated with currently available methods and apparatus for replacing and repairing valve seats.

SUMMARY OF THE INVENTION

The present invention comprises an apparatus for forming a valve seat while the valve body is positioned in-line. The valve reseater apparatus includes a cutting tool and means for rotating the cutting tool in order to form a valve seat of the desired size and configuration. The valve reseater also includes means for positioning the valve reseater near the valve seat to be repaired, as well as means for translating the cutting tool linearly as the cutting tool is being rotated. In the preferred embodiment, the rotation of the cutting tool is accomplished by means of a tool head which holds the cutting tool and which is rotated by means of a revolution shaft interconnected with a motor. The cutting tool is preferably translated by means of a translation screw which is preferably rotated by means of a rotatable handknob. The circumference of rotation is automatically controlled by means of a star wheel arrangement.

According to another aspect of the invention, a method of forming a valve seat of a certain configuration is described. The method comprises the steps of: removing the interior valve components from the valve body; inserting the valve reseater apparatus within the valve body; positioning the valve reseater apparatus near the valve seat to be repaired; moving the cutting tool so as to shape the valve seat to be of the desired configuration; and removing the valve reseater apparatus in order to replace the valve components within the valve body.

The present invention is advantageous in that the valve seat can be repaired and machined while the valve is still in-line, i.e., the valve need not be removed and transported to a machine shop. The valve reseater apparatus of the present invention is portable and can be taken to the valve, rather than vice versa. As a result, both the cost of repair and the shut-down time are substantially reduced. By making the valve reseating process relatively inexpensive and easy, the life of the valve itself is also prolonged.

Another feature of the present invention is that it is adaptable to various valve seat configurations which conform to different types of valves. The valve reseater apparatus of the present invention is able to machine the valve seat at the predetermined radius or configuration of the valve seat, in order to comply with the specifications and circumstances of the particular situation and valve assembly.

For a better understanding of the invention, and of the advantages obtained by its use, reference should be had to the Drawings and accompanying descriptive matter, in which there is illustrated and described a preferred embodiment of the invention.

BRIEF DESCRIPTION OF THE DRAWINGS

In the Drawings, which form a part of the instant specification and are to be read therewith, an optimum embodiment of the invention is shown and, in the various views, like numerals are employed to indicate like parts:

FIG. 2 is a side view of the valve reseater apparatus of the present invention as mounted within the valve body illustrated in FIG. 1;

FIG. 7 is a bottom view of the star wheel of the present invention taken along Line 7—7 of FIG. 6.

DETAILED DESCRIPTION OF THE DRAWINGS

Figure 1:
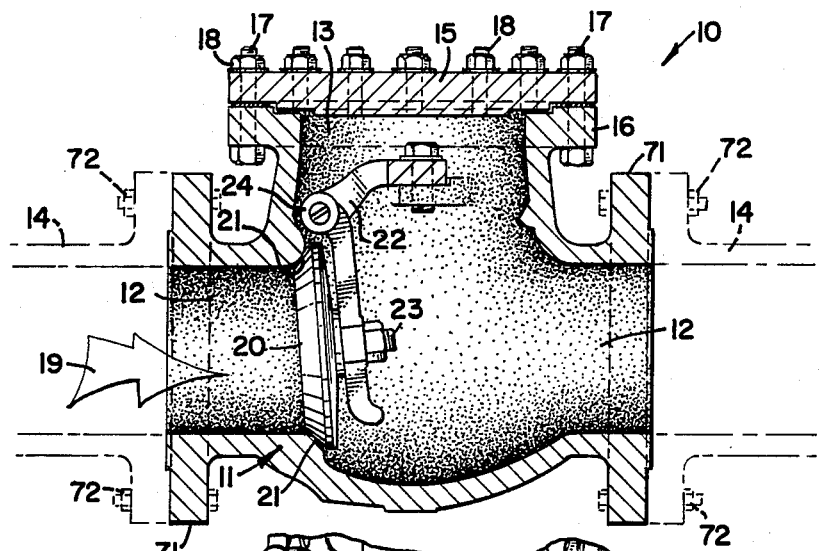
FIG. 1 is a side elevational view in section of a valve assembly which could be utilized in conjunction with the valve reseater apparatus of the present invention.

FIG. 1 illustrates a valve, generally designated at 10, which is of the type for which the valve reseater of the present invention would be suitable. Check valves similar to the one illustrated in FIG. 1 are utilized to restrict flow to one direction and often are used as a safety valve to prevent the build-up of excess pressure. A swing-check valve is illustrated in FIG. 1. With this type of valve, flow is permitted in only one direction, as illustrated by the arrow 19.

The valve 10 includes a valve body 11, having side openings 12 and an upper opening 13. The valve body 11 is typically made of a suitable type of steel. The valve 10 is positioned between two lengths of pipe 14 through which various types of fluid may flow, and the side openings 12 lead into the pipeline 14. The surface of the valve body 11 surrounding the side openings 12 may have an optional flanged portion 71 which may be interconnected with the pipeline 14 by a plurality of bolts 72. Typically, the valve 10 is interconnected to the pipes 14 by welding. The pipes 14 can be of any size, but are approximately 12–24 inches in diameter in the preferred embodiment.

The upper opening 13 of the valve 10 is covered by a cap or bonnet 15. The bonnet 15 is interconnected to the upper flange 16 of the valve body 11 by a plurality of studs or bolts 17 and corresponding nuts 18. A gasket (not shown) may also be positioned between the bonnet 15 and upper flange 16 of the valve body 11.

A disk or flapper 20 in the valve assembly 10 acts to close off flow, and the outer perimeter of the disk 20 rests against a valve seat 21 when fluid flow is being restricted. The configuration of the disk or flapper 20 may be varied, but the outer edges of the disk 20 are beveled at approximately a 45 degree angle, as illustrated in FIG. 1. In the preferred embodiment, the disk 20 may be made of a carbon steel or a stainless steel. The disk 20 is held to a disk carrier 22 by a locknut 23. The disk carrier 22 has a hinge 24, and it is suitably mounted within the valve body 11. When fluid flows from left to right, as shown in FIG. 1, and sufficient pressure builds up on the left side, the disk 20 rotates back about hinge 24 and permits flow through the valve body 11.

The valve assembly 10 described above is well-known in the art and has been described as background to the present invention. The valve reseater apparatus or portable boring mill of the present invention is shown generally at 25 in FIG. 2. The valve reseater apparatus 25 is shown mounted within the valve body 11 after the interior valve components within the valve body 11 have been removed.

The valve seat 21 may be either an integral, unitary part of the valve body 11, or a separate piece made of different material from the valve body itself. In a power plant valve arrangement, the metal valve seat may be made of various types of steel, such as a carbon steel, or a stainless steel, depending upon the particular application. It may also be made of the type of alloy steel designated by the trademark "STELLITE". The valve seat should be made of a material which possesses good strength, hardness, and corrosion-resistance properties.

Referring to FIG. 2, the valve reseater 25 has a central support frame 26. The support frame 26 has a greater length in the vertical direction than width, and the frame or post 26 extends through substantially the interior vertical dimension of the valve body 11. The frame 26 has four sides which are welded together in the preferred embodiment, and the frame's width becomes tapered toward its lower end. The frame 26 consists of a front side facing the valve seat 21, an opposite rear side, and two intervening transverse sides. The frame or housing 26 may consist of four downwardly depending side sections which are cooperatively connected to each other by means of a weld or other suitable means. The four sides of the frame or post 26 may consist of four outwardly projecting flanges as illustrated by the hidden lines in the plan view of FIG. 5.

Interconnected with the frame or post 26 are a plurality of stabilizers 27, which are utilized to position the valve reseater 25 within the valve body 11 and near the valve seat 21. The stabilizers 27 extend outwardly from the sides of the frame 26 and each consists of an elongated housing having a central threaded bore therethrough. A stabilizer screw or jackscrew 70 extends into the threaded bore, the outer end of the stabilizer screw 70 having a tip which abuts an inner wall of the valve body 11, as shown by the phantom lines in FIG. 2. Thus, the stabilizers 27 are of adjustable length. The inner end of the stabilizer housing has a plate 28 which is mounted to the frame 26 by means of bolts 29. In the preferred embodiment, there are four stabilizers 27, with one stabilizer 27 being on each of the three sides of the frame 26 except for the side facing the valve seat 21, and one stabilizer 27 being on the bottom of the frame 26. The stabilizer 27 on the rear side (the side opposite the valve seat 21) of the frame 26 is preferably positioned near the central portion of the frame 26 so as to be above the side port opening 12. The other two stabilizers 27 are on the two transverse sides of the frame 26, these two stabilizers preferably being opposite each other and located near the lower end of the frame 26. The stabilizers 27 can be adjusted manually by the operator via one of the port openings in the valve body 11.

Affixed to the upper end of the central frame 26 is a horizontal top plate 30. The top plate 30 may be suitably interconnected to the frame 26 by means of welding, bolts, or by constructing the top plate 30 and frame 26 as one unitary piece. The frame 26 and top plate 30 are made of aluminum in the preferred embodiment.

Figure 5:
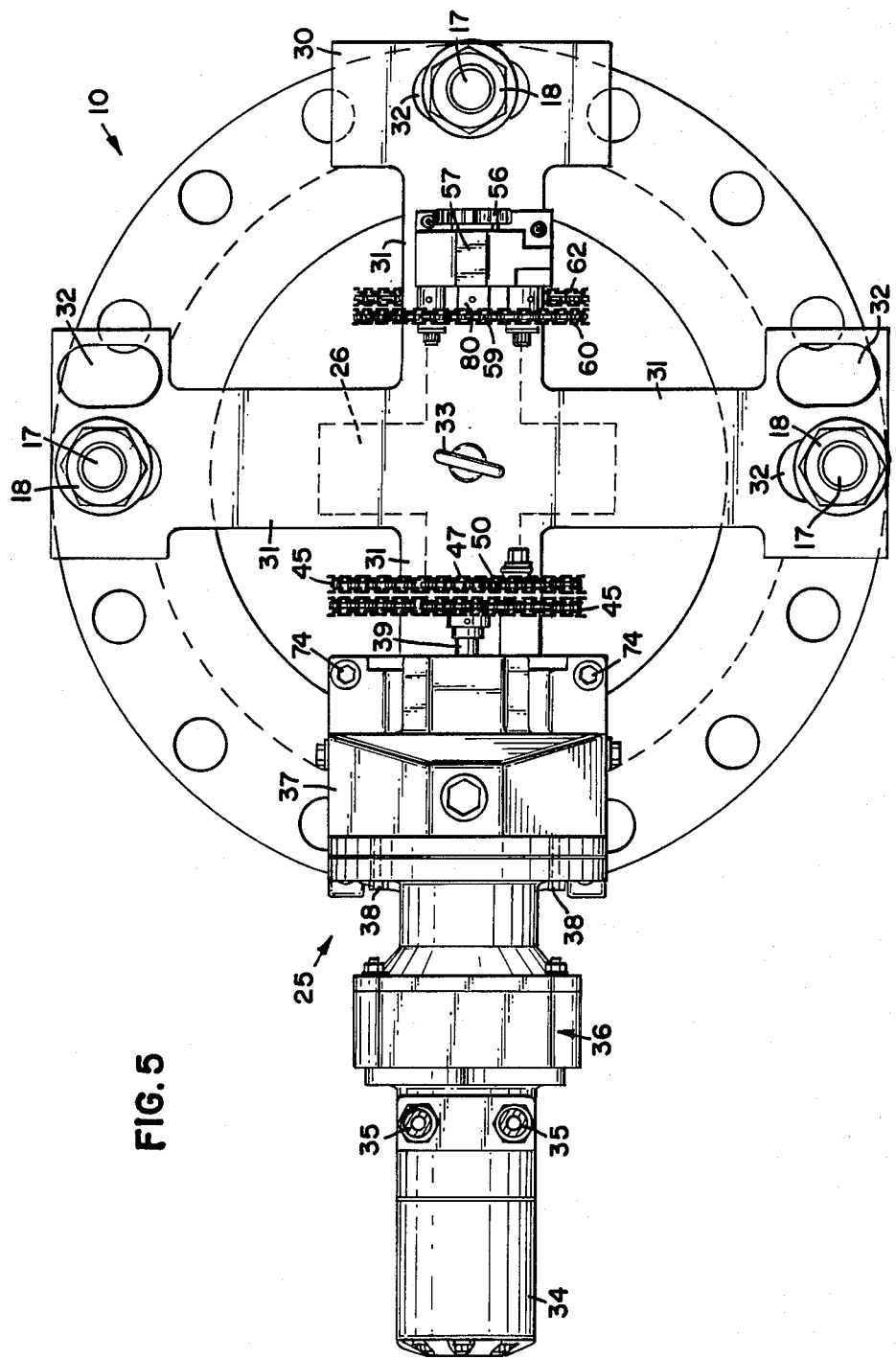
FIG. 5 is a top plan view of the valve reseater apparatus illustrated in FIGS. 2-4.

As illustrated in the plan view of FIG. 5, the preferred embodiment of the top plate 30 is cross-shaped, having four arms 31 which are perpendicular to each other. At the outer end of each arm 31 is an outer flange portion having one or more apertures 32 which are sized and configured to accommodate studs 17 which extend upward from the valve body 11. In the preferred embodiment, there are two elongated holes 32 on each arm's flange portion, the shape of the holes allowing for adjustment of the position of the valve reseater apparatus 25. A fastener or nut 18 is placed upon the stud 17 to secure the top plate 30 to the upper surface of the valve 10. At the center of the top plate is a hook 33 which can be used to support the valve reseater 25 as it is being inserted or withdrawn from the valve body 11. Preferably, the valve reseater 25 is positioned in place within the valve body 11 by means of an overhead lift device which is connected to the valve reseater 25 by means of the hood 33 on the top plate 30.

A motor housing 36, containing a motor 34, is cooperatively connected to the top plate 30. The motor 34 may be any suitable motor such as a hydraulic motor. The hydraulic motor 34 is provided with power hoses 35. The hydraulic motor 34 is preferably interconnected to a variable speed power supply which adjustably controls the speed of the revolutions of the motor shaft.

Interconnected with the rotating motor shaft (not shown) is a conventional gear reduction apparatus 37. The motor 34 is interconnected to the gear reduction apparatus housing 37 by means of suitable fastener 38 such as bolts. Extending outwardly from the gear reduction apparatus 37 is an output shaft 39. The gear reduction box 37 is either mounted directly to the top plate 30, or it is interconnected to a elevation plate 40 which is mounted upon the top plate 30. Suitable fasteners such as bolts 41 are utilized.

After the valve reseater 25 is positioned as desired by means of the stabilizers 27, a movable tool head, illustrated generally at 41, is used to machine the valve seat 21. The tool head 41 is best illustrated in the enlarged view of FIG. 6. The tool head 41 has a central longitudinal recessed portion, and a cutting tool holder 43 is slidably mounted within the recessed portion. The tool bit 42 is inserted within a central slot in the tool holder 43, according to any suitable mounting technique known in the industry. As shown in the Drawings, the tool bit 42 has a relatively flat surface, with two perpendicular edges of the tool bit 42 meeting at a central corner portion. The back end of the tool mount 43 is flush against a pair of support plates 75 within the tool head recess, the support plates 75 being interconnected to the tool head 41 by means of fasteners 76.

Figure 6:
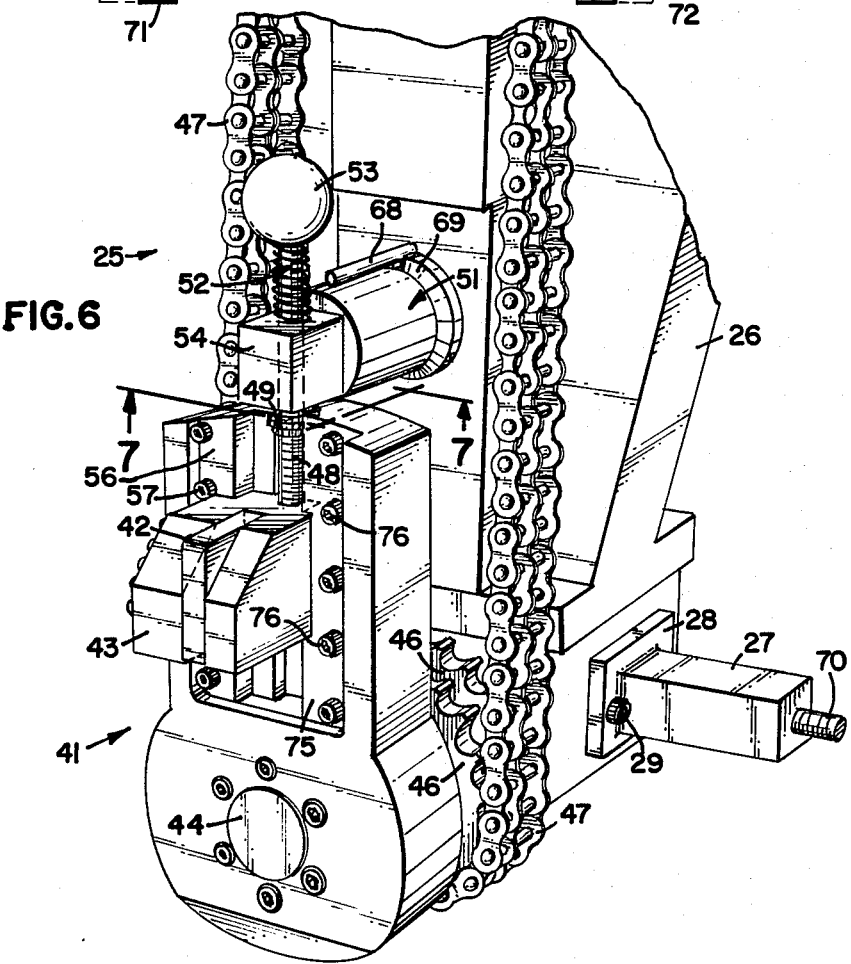
FIG. 6 is a perspective view of the tool head utilized with the valve reseater apparatus of the present invention.
Figure 3:
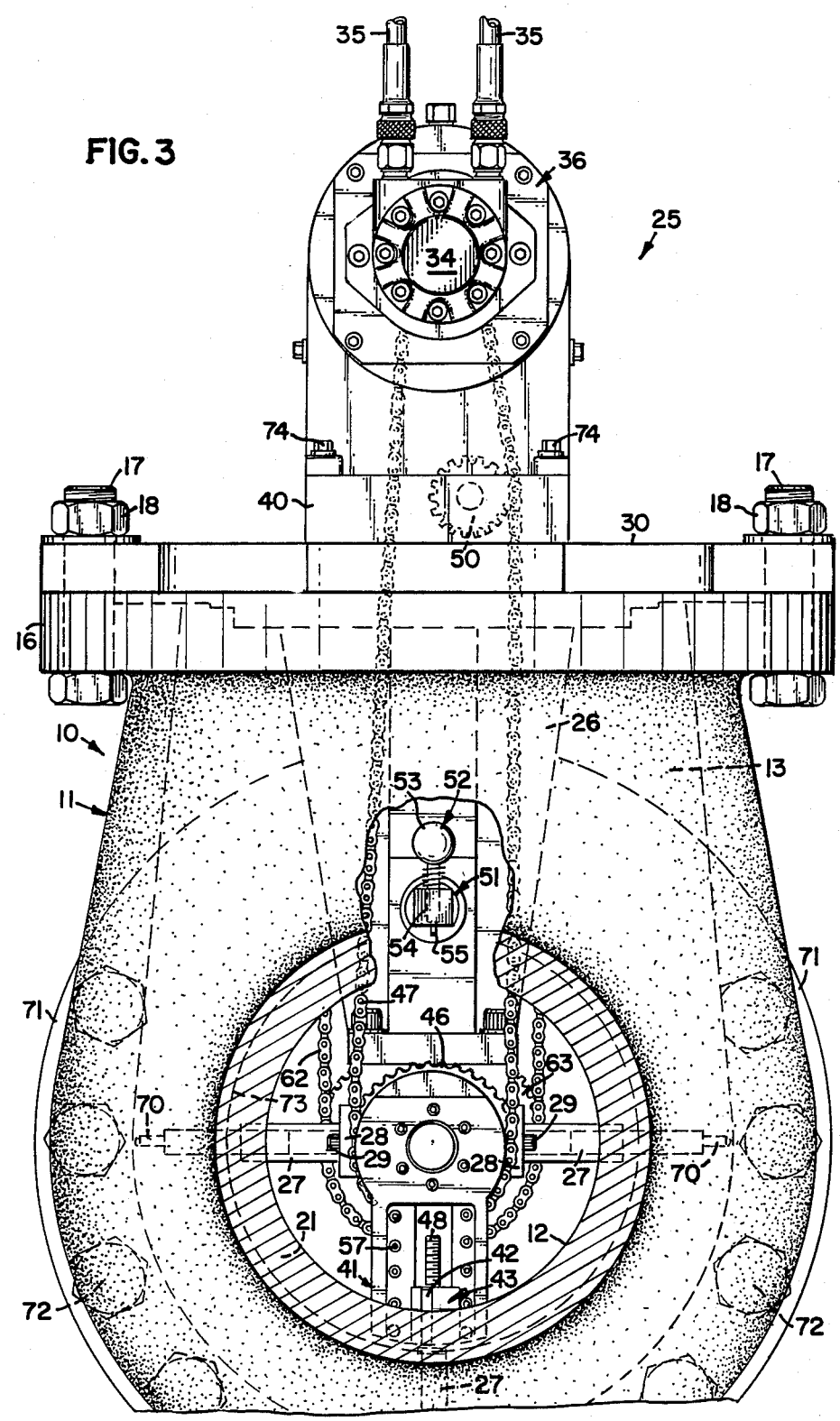
FIG. 3 is a front elevational view of the valve reseater apparatus taken along Line 3—3 of FIG. 2.

The tool head 41 is rotatable about a rotation shaft 44, which is located at the inner end of the tool head 41. FIGS. 2 and 3 illustrate the tool head 41 in the lowermost position of its rotation, and the phantom lines in FIG. 2 illustrate the tool head 41 in its uppermost position. FIG. 6 also shows the tool head 41 in its uppermost position.

The rotation shaft 44 for the tool head 41 is driven by the motor 34 through a sprocket assembly. Specifically, the output shaft 39 of the gear reduction device has at its outer end an upper rotation sprocket 45. At the inner end of the rotation shaft 44 is a lower rotation sprocket 46 which is driven by the sprocket 45. In the preferred embodiment, the sprockets 45, 46 are double sprockets interconnected by a double-width chain 47 of the type that is well known in the art. The speed of rotation of the output shaft 39 and the tool head 41 can be adjusted by means of the variable speed power supply (not shown). In this manner, the tool head 41 rotates about the periphery of the valve seat 21 in order to machine and shape the valve seat 21 as desired.

A small guide sprocket 50 may also be used in conjunction with the rotation chain 47. The sprocket 50 is positioned intermediate between the upper and lower rotation sprockets 45, 46. In the preferred embodiment, the intermediate sprocket 50 is mounted upon the elevation plate 40.

A novel feature of the present invention is the manner in which the cutting tool 42 automatically moves either outwardly or inwardly in a radial direction as the tool head 41 rotates. The tool holder 43 is slidably mounted with a threaded member of indexing screw 48 so as to be adjustable in the vertical direction, as viewed in FIG. 6. Thus, rotation of the indexing screw 48 causes radial movement of the cutting tool mount 43. Affixed to the outer end of the indexing screw 48 is a star wheel 49 having a plurality of notches, nine notches in the preferred embodiment. Rotation of the star wheel 49 causes corresponding rotation to the indexing screw 48.

As shown in FIG. 6, a cylindrical base member 51 is affixed to the front side of the frame 26 proximate the tool head 41. On the end of the base member 51 is mounted a vertical trip knob 52 with a handle 53 at its upper end. The shaft of the trip knob 52 extends through a guide member 54, and the lower end of the trip knob 52 has a vertical pin 55. The shaft is spring-loaded so that slight rotation of the trip knob 52 adjusts the trip pin 55 between an upper and lower position. In operation, the pin 55 is placed in its lower position, which causes automatic radial movement of the cutting tool 42, as explained below.

When the tool head 41 makes a complete rotation and passes its uppermost position, as illustrated in FIGS. 6 and 7, the trip pin 55 meshes with a notch in the star wheel 49, causing a slight rotation of the star wheel. In the preferred embodiment, the threading of the screw 48 is such that the indexing screw 48 moves the cutting tool holder 43 radially inward 0.025 inches when the indexing screw 48 makes a complete revolution. In the preferred embodiment, the indexing screw 48 makes a complete revolution when the head 41 has completed nine revolutions. Differences in the amount and direction of the radial movement of the tool 42 can be accomplished by changing the design of the indexing screw 48 and/or star wheel 49. Thus, as the cutting tool 42 rotates around the circumference of the valve seat, the tool 42 is gradually moved radially inward. Because of the hardness of the valve seat material, several revolutions of the tool bit 42 are required to shape and finish the valve seat 21 as desired. Preferably, the tool head's rotation occurs at a relatively slow rate.

Figure 4:
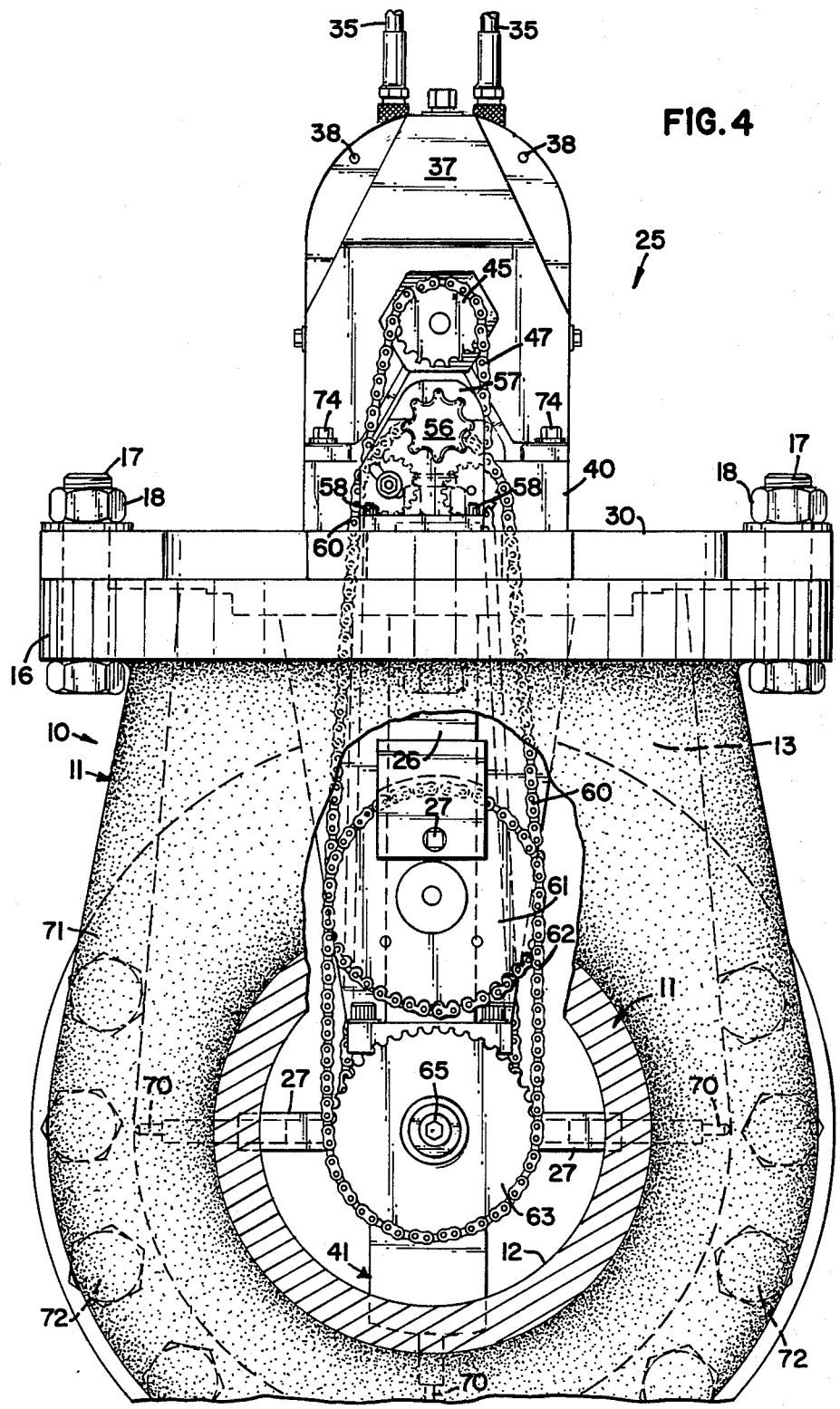
FIG. 4 is a rear elevational view of the valve reseater apparatus taken along Line 4—4 of FIG. 2.

Another novel aspect of the present invention is that the construction of the valve reseater 25 allows the cutting tool 42 to be translated linearly as the tool head 41 is rotating. The linear translation is in a direction parallel to the pipeline 14 and perpendicular to the plane of the valve seat 21. The arrow in FIG. 2 indicates the direction of translation of the tool head 41. In FIG. 4, a portion of the valve body 11 has been cut away so as to reveal the details of construction for the translation sprocket assembly. Referring to FIGS. 2 and 4, a handknob 56 is affixed upon a bracket 57 which is mounted upon the top plate 30 by means of suitable fasteners 58 such as bolts. The handknob 56 preferably has a plurality of notches to facilitate precise control and a comfortable grip by the operator. A central shaft 80 extends from the handknob 56 to an upper translation sprocket 59. Meshing with the gears of the translation sprocket 59 is an upper translation chain 60. At the lower end of the upper translation chain 60 is an intermediate translation sprocket 61, which is a double sprocket. Thus, rotation of the handknob 56 ultimately causes rotation of the double sprocket 61. The handknob 56 is preferably positioned above the top plate 30 to facilitate manual control of the handknob 56 by the operator.

The right side of the double sprocket 61, as viewed in FIG. 2, accommodates a lower translation chain 62, the lower end of which is affixed to a lower translation sprocket 63. Both the intermediate sprocket 61 and the lower sprocket 63 have a central shaft 64 and 65 respectively. The shafts 64, 65 are operatively interconnected to an upper screw 66 and a lower screw 67 which extend horizontally through the frame 26. Rotation of the sprockets 62, 63 causes translation of the screws 66, 67.

The upper screw 66 is operatively interconnected with the trip knob assembly 52 so as to move it to the left as illustrated in FIG. 2. The screw 67 is operatively interconnected with the tool head assembly 41 so as to also move the tool head 41 to the left as the sprocket 63 is rotated. The screws 66, 67 have an equal degree of threading and move by the same amount so as to keep the trip knob 52 and tool head 41 in alignment. In the preferred embodiment, one complete revolution of the handknob 56 causes horizontal translation to the left of the trip knob 52 and tool head 41 by 0.208 inches.

Affixed to the frame 26 is a horizontal, stationary guide pin 68 in the preferred embodiment. As illustrated best in FIG. 6, the cylindrical base member 51 moves horizontally as the screw 66 moves, and the guide pin 68, positioned within a notch in the base 69 of the cylindrical member 51, assures that the trip knob 53 is translated in a straight line.

The valve seat 21 illustrated in the Drawings has a curvature which approximates the radius of a circle in its central portion. However, it is to be understood that the present invention could be utilized to form valve seats 21 having radaii of a curvature of different configurations. In FIG. 3, the dashed circular line indicates the outermost edge 73 of the seat valve 21.

To form the valve seat 21, the rotation or radial movement of the cutting tool 42 and the translation of the cutting tool 42 are regulated so that the amount of radial and linear movement of the cutting tool 42 occurs at the proper rate relative to each other. For example, if a portion of the valve seat 21 is to have a cross section of 45 degrees, the amount of radial movement in the vertical direction, as controlled by the indexing screw 48, would be equal to the horizontal translation of the tool bit 42, as controlled by the screws 66, 67. Flat areas on the valve seat 25 can be produced by machining in only the radial or linear direction, not simultaneously. More complex configurations require calculations of the relative vertical and horizontal movement according to standard rules of trigonometry well known to those skilled in the art. The shape of the tool bit 42 can also be modified depending upon the valve seat design.

An aspect of the present invention is that the ratio of rotation to translation can be varied continuously. In the embodiment illustrated, the handknob 56 is gradually rotated a certain amount as the tool head 41 completes each rotation. It is also within the scope of the present invention to utilize a servomechanism to control the rate of radial and linear machinery. The servomechanism can be computer controlled to continuously vary the relative radial and linear movement rates, so that continued manual control by one or more operators is unnecessary.

The valve reseater apparatus 25 of the present invention can be adapted to various sizes of pipes 14 and valve bodies 11. For relatively small size adjustments, the position of the stabilizers 27 can be changed and the position of the tool holder 43 can be adjusted. For relatively larger changes in size, the modular interconnection of the parts allows for simple adjustments for size. For example, larger or smaller stabilizers 27 can be attached to the frame 26, and a different size tool head 41 can be mounted upon the shaft 44. Also, the size of the top plate 30 can be varied according to the size of the valve body 11. It is also within the scope of the present invention to provide the frame or post 26 with means to allow for vertical adjustment of the frame's size.

In operation of the unit 25, the valve reseater 25 is positioned within the valve body 11 by means of the stabilizers 27. The top plate 30 is positioned upon the top of the valve body 11 and secured thereto by means of suitable mounting techniques. The cutting tool 42 is positioned against the valve seat 21. The motor 34 is activated to cause rotation of the tool head 41 and cutting tool 43, with the speed of rotation being controlled by the variable power supply. As the head 41 rotates at a predetermined speed, the operator gradually and simultaneously rotates the handknob 56 at a predetermined rate to cause horizontal translation of the cutting tool 42. Preferably, the disk 20 is rewelded to conform with the specifications of the particular application and to conform with the newly-formed refitted valve seat 21. After the valve reseater apparatus 25 is removed from the valve body 11, the interior valve components are reinstalled, and the valve 10 can be placed back into operation.

Even though numerous characteristics and advantages of the invention have been set forth in the foregoing description, together with details of the structure and function of the invention, the disclosure is illustrative only, and changes can be made in detail, especially in matters of shape, size and arrangement of parts, within the principles of the invention, to the full extent indicated by the broad general meaning of the appended claims.

What is claimed is:

1. A valve reseater apparatus for forming or finishing a valve seat in a valve body, said valve seat having a perimeter which forms a transverse plane of said valve seat, said valve reseater apparatus comprising:
   (a) a stationary valve reseater frame, said frame including a plurality of adjustable stabilizer means to support and position said frame within a valve body and proximate the valve seat;
   (b) tool holder means for supporting a cutting tool, said tool holder means being operatively interconnected to a rotation shaft for rotating said tool holder means about said rotation shaft and said cutting tool around the perimeter of said valve seat;
   (c) translation means for translating said tool holder means in a direction substantially perpendicular to the transverse plane of the valve seat, said translation means being operative as said cutting tool rotates around the perimeter of said valve seat, wherein said translation means comprises:
      (i) a translation screw operatively interconnected to said tool holder means, wherein rotation of said translation screw causes translation of said tool holder means; and
      (ii) a rotatable handknob operatively interconnected to said translation screw;
   (d) radial movement means for moving said tool holder means in a radial direction so as to vary the diameter of rotation of said tool holder means, said radial movement means being operative as said cutting tool rotates around the perimeter of said valve seat, wherein said radial movement means comprises:
      (i) an indexing screw having a first end and an opposite second end, said first end being interconnected with said tool holder means, wherein rotation of said indexing screw causes movement of said tool head in a radial direction;
      (ii) a star wheel mounted upon said second end of said indexing screw, said star wheel having a plurality of notches, wherein rotation of said star wheel causes rotation of said indexing screw;

(iii) trip means for engagement with said star wheel to cause incremental rotation of said star wheel each time said tool holder means completes a full rotation; and (e) disengagement means for disengaging said trip means from said star wheel so as to discontinue radial movement.

2. The apparatus of claim 1, wherein said trip means comprises a trip pin which is movable between a first, engaging position which causes movement of said star wheel, and a second, non-engaging position, said trip pin's position being controlled by a handknob.

* * * * *